(12) United States Patent
Slater

(10) Patent No.: US 11,645,161 B2
(45) Date of Patent: May 9, 2023

(54) CATALOG OF FILES ASSOCIATED WITH SNAPSHOTS

(71) Applicant: HEWLETT PACKARD ENTERPRISE DEVELOPMENT LP, Houston, TX (US)

(72) Inventor: Alastair Slater, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 95 days.

(21) Appl. No.: 16/830,421

(22) Filed: Mar. 26, 2020

(65) Prior Publication Data

US 2021/0303405 A1 Sep. 30, 2021

(51) Int. Cl.
*G06F 16/11* (2019.01)
*G06F 16/13* (2019.01)
*G06F 11/14* (2006.01)

(52) U.S. Cl.
CPC ........ *G06F 11/1451* (2013.01); *G06F 16/128* (2019.01); *G06F 16/13* (2019.01); *G06F 2201/84* (2013.01)

(58) Field of Classification Search
CPC ..... G06F 11/1451; G06F 16/13; G06F 16/128
USPC ....................................................... 707/649
See application file for complete search history.

(56) References Cited

U.S. PATENT DOCUMENTS

| | | | |
|---|---|---|---|
| 9,177,177 B1 | 11/2015 | Patil et al. | |
| 9,575,841 B2 | 2/2017 | Mason, Jr. et al. | |
| 9,705,730 B1 | 7/2017 | Petri et al. | |
| 10,481,983 B1 * | 11/2019 | Miah | G06F 16/9024 |
| 2011/0078118 A1 | 3/2011 | Kushwah | |
| 2014/0095816 A1 | 4/2014 | Hsu et al. | |
| 2016/0042090 A1 * | 2/2016 | Mitkar | G06F 11/1448 707/649 |
| 2019/0073378 A1 | 3/2019 | Guturi et al. | |

OTHER PUBLICATIONS

Silberschatz, Abraham; Galvin, Peter; Gagne, Greg. Operating System Concepts with Java. 2007. John Wiley & Sons, Inc. Seventh Edition. pp. 443-451. (Year: 2007).*

Jones, Richard WM. "How does mount load the right kernel module?" Aug. 18, 2009. Accessed Sep. 10, 2022 from <https://rwmj.wordpress.com/2009/08/18/how-does-mount-load-the-right-kernel-module/> (Year: 2009).*

Pomeranz, H.; "XFS (Part 1)—The Superblock"; May 21, 2018; 7 pages total, by <https://righteousit.wordpress.com/2018/05/21/xfs-part-1-superblock/>.

(Continued)

*Primary Examiner* — Robert W Beausoliel, Jr.
*Assistant Examiner* — Arthur Ganger
(74) *Attorney, Agent, or Firm* — Trop, Pruner & Hu, P.C.

(57) ABSTRACT

A backup system includes a processor and a machine-readable storage storing instructions. The instructions are executable by the processor to: access a plurality of blocks included in a block-based backup of a first snapshot of a storage volume; determine, based on the plurality of blocks of the block-based backup, a first filesystem stored on the storage volume, the first filesystem being a first type of filesystem; select, from a plurality of filters, a first filter associated with the first type of filesystem; determine a changed file in the first filesystem based on the selected first filter; and update a catalog to indicate that the changed file is associated with the first snapshot.

20 Claims, 6 Drawing Sheets

(56) References Cited

OTHER PUBLICATIONS

Pomeranz, H., "XFS (Part 2)—Inodes," May 23, 2018, 9 pages total, by <https://righteousit.wordpress.com/2018/05/23/xfs-part-2-inodes/>.

Quinlan, S et al., "Venti: A New Approach to Archival Storage," Jan. 28, 2002, 14 pages total.

* cited by examiner

CATALOG OF FILES ASSOCIATED WITH SNAPSHOTS

BACKGROUND

Computing devices may include components such as a processor, memory, caching system, and storage device. The storage device may include a hard disk drive that uses a magnetic medium to store and retrieve data blocks. Some systems may store or "backup" copies of important data for archival and recovery purposes. For example, in the event that a storage device fails, a backup copy may be used to recover the data that was stored on the failed system. In some examples, backups may be performed periodically to capture copies of the data at various points in time.

BRIEF DESCRIPTION OF THE DRAWINGS

Some implementations are described with respect to the following figures.

DETAILED DESCRIPTION

Figure 1:
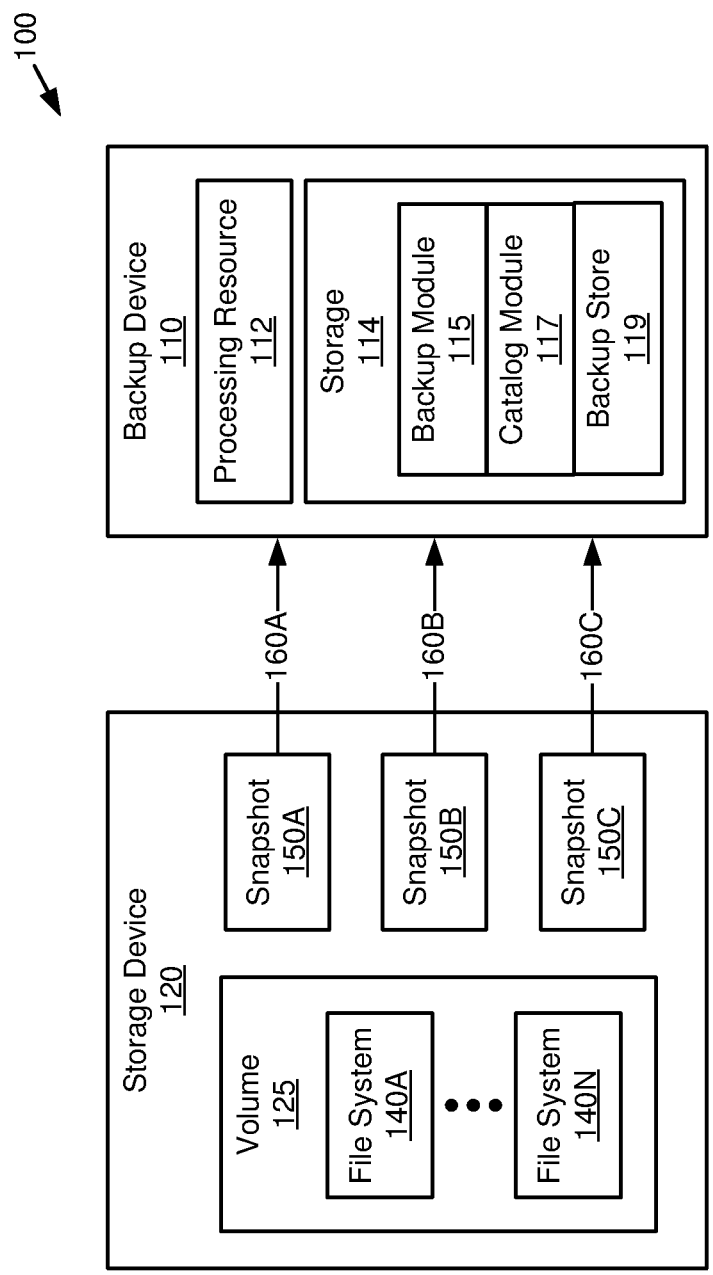
FIG. 1 is a schematic diagram of an example system, in accordance with some implementations.

A backup process of a computing system may include copying data blocks stored in a storage device (e.g., a storage array) to a backup device that may store the data blocks in the form of a backup. In examples described herein, a "backup" may refer to a form in which a backup device stores a collection of data, which may be different from a form in which the data blocks are stored on a storage device (e.g., storage array) from which they are being backed up. For example, a backup may comprise a deduplicated representation of the data blocks copied to the backup device for backup. In some examples, a backup process may copy, to a backup device, a specified collection of data that is stored on a storage device in files and directories of a filesystem.

In some examples, the specified collection of data to be copied to the backup device may comprise one or more volumes of a storage device, some or all contents of a filesystem in which data is stored on a storage device (e.g., all data stored under a given directory, such as a root directory or one or more sub-directories), or the like. When generating a full backup, a backup process may copy all data blocks of the specified collection of data to the backup device (which the backup device may store as a backup referred to as a "full backup" herein). When generating an incremental backup, a backup process may copy exclusively the data blocks of the specified collection of data that have changed since a prior backup, and the backup device may store these changed blocks in a form referred to as an "incremental backup" herein.

In some examples, backups may be generated based on point-in-time snapshots of volume(s) (or other collection(s) of data) of a source storage device (e.g., a backup process may copy data to a backup device based on the content of a snapshot on the source storage device). In some examples, identifying the changed blocks in the specified collection of data (e.g., for an incremental backup) may be performed based on point-in-time snapshots of volume(s) (or other collection(s) of data) that contain the specified collection of data (e.g., specified director(ies) of a filesystem).

In examples described herein, backup processes refer to "block-based" backup processes that copy data for backup at a block level. In examples described herein, a block level is a level of data storage that is below a file and directory level of data storage. In such examples, a block level may be a level at which a block storage device (e.g., a hard disk drive (HDD), solid state drive (SSD), or the like) or a virtual volume, for example, may store data thereon, and a level upon which files and directories are implemented by a filesystem. In examples described herein, while a collection of data to be backed up may be specified at a filesystem level (e.g., one or more directories or the like), a block-based backup process may copy the data blocks making up that collection of data to a backup device as a stream of data blocks, without providing separate file-level or directory-level information describing how the data of those data blocks is stored in a filesystem at a source device. However, block-based backups may include embedded filesystem elements, metadata elements, and other structural elements within the content of the blocks themselves. Such elements may include Mode information, volume management elements, format elements, and other items that are not visible to the user but are part of the storage format. Such block-level backup processes may be considered in contrast to file-level backup processes, which may perform backup at the file level, in which the data is provided to the backup device as a stream of files with file- and directory-level information indicating the files being backed up and the director(ies) in which they are stored, for example. File-based backups, however, may not include the filesystem elements, metadata elements, and other structural elements embedded within the content being backed up, as compared with block-based backups. In examples described herein, backups (e.g., full and incremental backups) refer to block-level backups representing a stream of data blocks provided to a backup device and excluding separate file-level or directory-level information describing how the data of those data blocks is stored in a filesystem at a source device.

In addition, as used herein, a "snapshot" is a representation of the data included in storage volume(s) (or other collection(s) of data) at a particular point in time. However, identifying the files and/or directories (referred to herein as "filesystem objects") that are new or changed between snapshots may involve "mounting" the data represented in the snapshots, and then traversing or "walking" a filesystem included in the mounted data to find changes to file(s) and director(ies) (e.g., based on timestamps of interest). However, such techniques may involve a significant amount of time and processing bandwidth.

As described further below with reference to FIGS. 1-7, some implementations may include analyzing the content of blocks of a block-based backup (e.g., of a snapshot), identifying, from the content of the blocks, a filesystem in which the blocks are stored in a source storage device (i.e., separate from the backup device), and selecting a particular filter that corresponds to a type of the identified filesystem. The selected filter may be used to identify blocks that include metadata of the filesystem. The metadata may be analyzed to determine any changes in the objects in the filesystem (e.g., new file, changed directory, etc.). Such change information may be used to generate and/or update a catalog of changed objects associated with various snapshots without having to mount each snapshot and then walk any included filesystems. In this manner, the amount of time and processing bandwidth required to identify filesystem objects associated with snapshots may be reduced.

Referring now to FIG. 1, shown is a schematic diagram of an example system 100, in accordance with some implementations. As shown, the system 100 may include a backup device 110 and a storage device 120. The backup device 110 may be a backup appliance (e.g., comprising one or more controllers and one or more storage devices), or any other type of computing device, such as a storage array, a server, etc. The storage device 120 may include one or more storage devices, such as non-volatile storage devices (e.g., HDDs, SSDs, etc.), In some examples, storage device 120 may be a storage array.

As shown, in some implementations, the backup device 110 may include a processing resource 112 and machine-readable storage 114. The processing resource 112 may include one or more of a processor, central processing unit (CPU), processing core, etc. The processing resource 112 can include any number of processing engines or "cores" (not shown). The machine-readable storage 114 may include one or more non-transitory storage media such as HDDs, SSDs, flash storage, optical disks, and so forth.

In some implementations, the machine-readable storage 114 may include a backup module 115, a catalog module 117, and a backup store 119. The catalog module 117 and the backup store 119 are discussed below with reference to FIGS. 3-7. In some examples, the backup module 115 and/or catalog module 117 may be implemented via instructions (e.g., software and/or firmware) executable by processing resource 112 and stored in the machine-readable storage 114. However, the backup module 115 and/or catalog module 117 can be implemented in any suitable manner. For example, some or all of the backup module 115 and/or catalog module 117 could be hard-coded as circuitry included in the processing resource 112. In other examples, some or all of the backup module 115 and/or catalog module 117 could be implemented on a remote computer (not shown), as web services, and so forth. In another example, the backup module 115 and/or catalog module 117 may be implemented in one or more controllers of the computing device 110.

Figure 2:
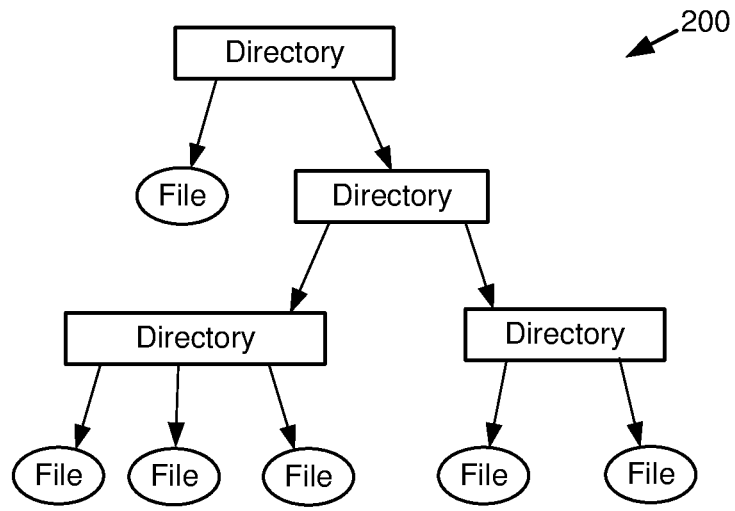
FIG. 2 is an illustration of an example file system, in accordance with some implementations.

As shown, in some implementations, the storage device 120 may store a volume 125 including any number of filesystems 140A-140N (also referred to as "filesystems 140"), or respective portions thereof. The filesystems 140A-140N may use different filesystem types or formats (e.g., XFS, ZFS, etc.). In some implementations, each filesystem 140 may be organized into files and directories. For example, referring to FIG. 2, shown is an illustration of an example filesystem 200 including files and directories organized as nodes of a hierarchical tree structure. Referring again to FIG. 1, each filesystem 140 may include data representing files (referred to herein as "file data"). Further, the filesystem 140 may also include data about the filesystem and objects (referred to herein as "metadata"), such as parent-child relationships of files and directories, file permissions, time stamps, identifiers, size information, and so forth. For example, in some filesystems, the metadata may be stored in particular objects (e.g., Modes).

In some implementations, the storage device 120 may generate snapshots 150A-150C (also referred to as "snapshots 150") of data of the volume 125 (including filesystems 140A-140N) as it existed at various points in time. For example, the snapshot 150A may represent the data of volume 125 at a first point in time, the snapshot 150B may represent the data of volume 125 at a second point in time, and the snapshot 150C may represent the data of volume 125 at a third point in time.

In some implementations, storage device 120 may a block-based backup process for each of the snapshots 150A-150C, including providing data of snapshots 150A-150C in data streams 160A-160C, respectively (also referred to as "data streams 160"), each of which may be a stream of data blocks. In such examples, the backup module 115 may generate and store in backup store 119 a respective block-based backup based on each of the data streams 160A-160C. Each of the generated block-based backups may represent data of a respective one of snapshots 150A-150C, in a block-based representation different from the form in which snapshots 150A-150C are stored on storage device 120. For example, backup module 115 may perform deduplication on the received data streams 160A-160C and store the block-based backups in a deduplicated form. In some implementations, data blocks for a given file of the filesystems 140 are not necessarily stored together or contiguously in a backup of the backup store 119, and therefore data blocks corresponding to different files may be intermingled in a backup of the backup store 119. Further, in some implementations, one or more data blocks in the backup store 119 may include metadata of the filesystem 140.

Figure 3:
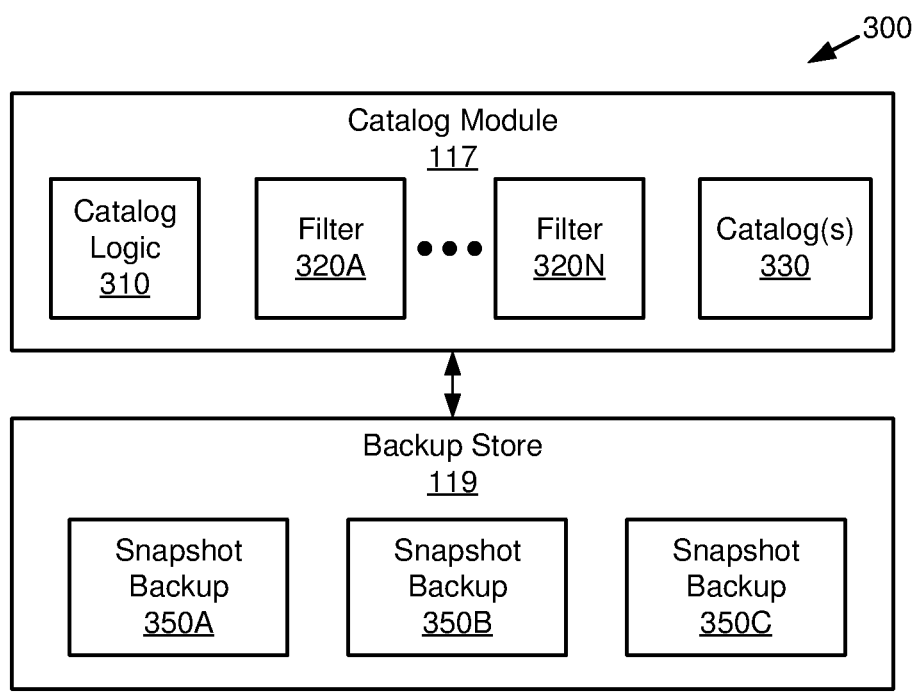
FIG. 3 is a schematic diagram of an example backup system, in accordance with some implementations.

Referring now to FIG. 3, shown is a diagram of an example backup system 300. As shown, the backup system 300 includes examples of catalog module 117 and backup store 119 of FIG. 1, in accordance with one or more implementations. As shown, in some examples, the catalog module 117 may include catalog logic 310, any number of filters 320A-320N (also referred to as "filters 320"), and any number of catalogs 330. Further, in some examples, the backup store 119 may include snapshot backups 350A-350C (also referred to as "snapshot backups 350"), which may be block-based backups of data streams 160A-160C that represent snapshots 150A-150C, as described above. In the example of FIG. 3, the snapshot backup 350A is a block-based backup of the snapshot 150A (shown in FIG. 1). Similarly, the snapshot backup 350B is a block-based backup of the snapshot 150B, and the snapshot backup 350C is a block-based backup of the snapshot 150C. In some implementations, the backup store 119 may store backup data in deduplicated form. In examples described herein, backup data may be deduplicated by identifying "duplicate" blocks (or other data units) having content identical to that of other blocks, and replacing at least some duplicated blocks with pointers to the stored full copy of the block. In such examples, various units of data may be shared between different backups of backup store 119.

In some implementations, the catalog logic 310 may analyze the content of blocks of a snapshot backup 350 to identify, from the content of the blocks, a filesystem in which blocks of the associated snapshot 150 are stored on storage device 120. For example, the catalog logic 310 may parse or read content of the blocks in the snapshot backup 350A, and may identify a block that includes a particular identifier or coded value (e.g., a "magic number" associated with a file system) within the content of the block. The particular identifier may be predefined as being uniquely associated with a given type of filesystem (e.g., an XFS filesystem). Accordingly, in some implementations, the catalog logic 310 may use the particular identifier in a block of snapshot backup 350A to determine that at least some data of the associated snapshot 150A is stored in a filesystem of the given type on the storage device 120. In some examples, the block including the particular identifier may be referred to as a "superblock" that identifies a filesystem. In some examples, the catalog logic 310 may identify the filesystem by analyzing the content of blocks of a snapshot backup 350 after it is stored in the backup store 119 (e.g., after it is stored in the backup store 119 in a deduplicated form, in some examples). In other examples, the catalog logic 310 may identify the filesystem by analyzing the content of blocks included in a data stream 160 as it is received and processed by backup device 120 (e g, inline with backup device 110 receiving data stream 160 from the storage device 120 and generating snapshot backup 350). In some implementations, the catalog logic 310 may search for a filesystem identifier (i.e., content that identifies a particular filesystem) in block (s) in particular location(s) within the snapshot backup 350 (e.g., in the first block, in the second block, in the first ten blocks, and so forth). Further, in some implementations, the catalog logic 310 may search for the filesystem identifier continually or according to a pattern (e.g., in every block, in every other block, in every tenth block, etc.).

In one or more implementations, the catalog logic 310 may select a particular filter 320 that corresponds to the determined filesystem type. Each filter 320 may be program code (i.e., executable instructions) and/or data structure(s) to locate and interpret metadata in blocks that are associated with the determined filesystem type. For example, the selected filter 320 may be used to analyze blocks in a snapshot backup 350 (or in a data stream 160) based on parameters associated with the filesystem type (e.g., block size, block format, field locations and/or offsets, field names, field values, identifiers or coded values, and so forth), and to identify any blocks that match criteria associated with metadata (e.g., a particular value located at a specific offset of the block). In some implementations, where a snapshot 150 represents differences from a prior snapshot, a snapshot backup 350 for snapshot 150 (or of a data stream 160 of snapshot 150) may represent blocks that have changed since the prior snapshot, and the catalog logic 310 may use the selected filter 320 to identify metadata in those changed blocks that are represented in snapshot backup 350 or data stream 160). In such examples, this difference may also represent a difference from a prior backup (e.g., a backup based on the prior snapshot).

In some implementations, the catalog logic 310 may analyze the metadata in the changed blocks to determine names and locations of filesystem objects that may have been changed since a previous backup. The catalog logic 310 may track the objects in a list or other data structure as they are identified during the processing of the metadata, and may gradually determine a tree structure based on the tracked objects. For example, the determined tree structure may indicate that a first file is included in a first directory, and that the first directory is included in a second directory.

In some implementations, the catalog logic 310 may identify differences between the determined tree structure and a previous tree structure (e.g., a previous tree structure corresponding to a previous snapshot or backup), and may use these differences to determine the filesystem objects that have changed in a current snapshot or backup relative to the previous snapshot or backup. It is noted that, when a filesystem object (e.g., file or directory) is changed prior to a given snapshot, the metadata associated with the changed object will also be changed prior to the given snapshot. Accordingly, the corresponding block(s) that store the changed metadata will also be changed prior to the given snapshot, and be represented in a block-based backup (or of a data stream 160 for such a block-based backup) of the given snapshot. In such examples, catalog logic 310 may relatively efficiently analyze the changed blocks by analyzing the blocks in the block-based backup (or the corresponding data stream 160) of the given snapshot. In this manner, limiting the metadata analysis to changed blocks may allow identification of changed objects in a more time and processing bandwidth efficient manner.

In some implementations, the catalog logic 310 may generate or update a catalog 330 to include information indicating the objects associated with a snapshot. For example, a catalog 330 may include a list of file(s), director (ies), or any combination thereof as found in (or at the point in time of) a given snapshot. Further, in some examples, the catalog 330 may indicate the files and/or directories that were changed between the time of a given snapshot and the time of a prior snapshot. Furthermore, the catalog 330 may include additional information that can be derived from the metadata, such as version numbers, time stamps, sizes, permissions, usage statistics, and so forth. In some examples, each catalog 330 may only include information regarding a single snapshot (e.g., a listing of files that changed between a particular snapshot and a prior snapshot). In other examples, each catalog 330 may include information regarding multiple snapshots. In some implementations, catalog information regarding which objects were changed for each snapshot may be used to analyze performance and/or issues of the storage system. For example, such information may be used to identify files that undergo a relatively high number of changes, and to further analyze the identified files (e.g., to scan for possible malware attack, for misconfiguration of applications utilizing those files, and so forth).

In some examples, a catalog may be generated for an incremental backup (e.g., snapshot backup 350B), and may list the files and directories that were changed between the time of the incremental backup and a previous backup (e.g., snapshot backup 350A). In such examples, the catalog associated with the incremental backup may be combined with a catalog associated with the previous backup in order to generate a full catalog of all files and directories including changes captured by one or both of the incremental backup and the previous backup. In such examples, one or more incremental backups and a previous full backup may be used to generate a synthetic full backup representing a point in time of one of the incremental backups, and in such examples, the respective catalogs of the previous backup and the one or more incremental backups may be combined to generate a synthetic full catalog of all files and directories including changes captured by the synthetic full backup.

In some implementations, the catalog logic 310 may identify changed objects for multiple filesystems, where a snapshot includes data from each of the filesystems. For example, assume a given snapshot backup 350 (or a data stream 160) includes blocks from with two filesystems of different types. In such situations, the catalog logic 310 may perform two cataloging operations using two filters 320 that correspond to the two different filesystems. In some examples, the catalog logic 310 may update a single catalog 330 to list the files and directories of the two filesystems. In other examples, the catalog logic 310 may update two separate catalogs 330 to respectively list the files and directories of the two filesystems. In examples described herein, catalog logic 310 may be implemented via instructions (e.g., software and/or firmware) executable by processing resource (e.g., 112) and stored in a machine-readable storage medium (e.g., 114). However, catalog logic 310 can be implemented in any suitable manner.

Figure 4:
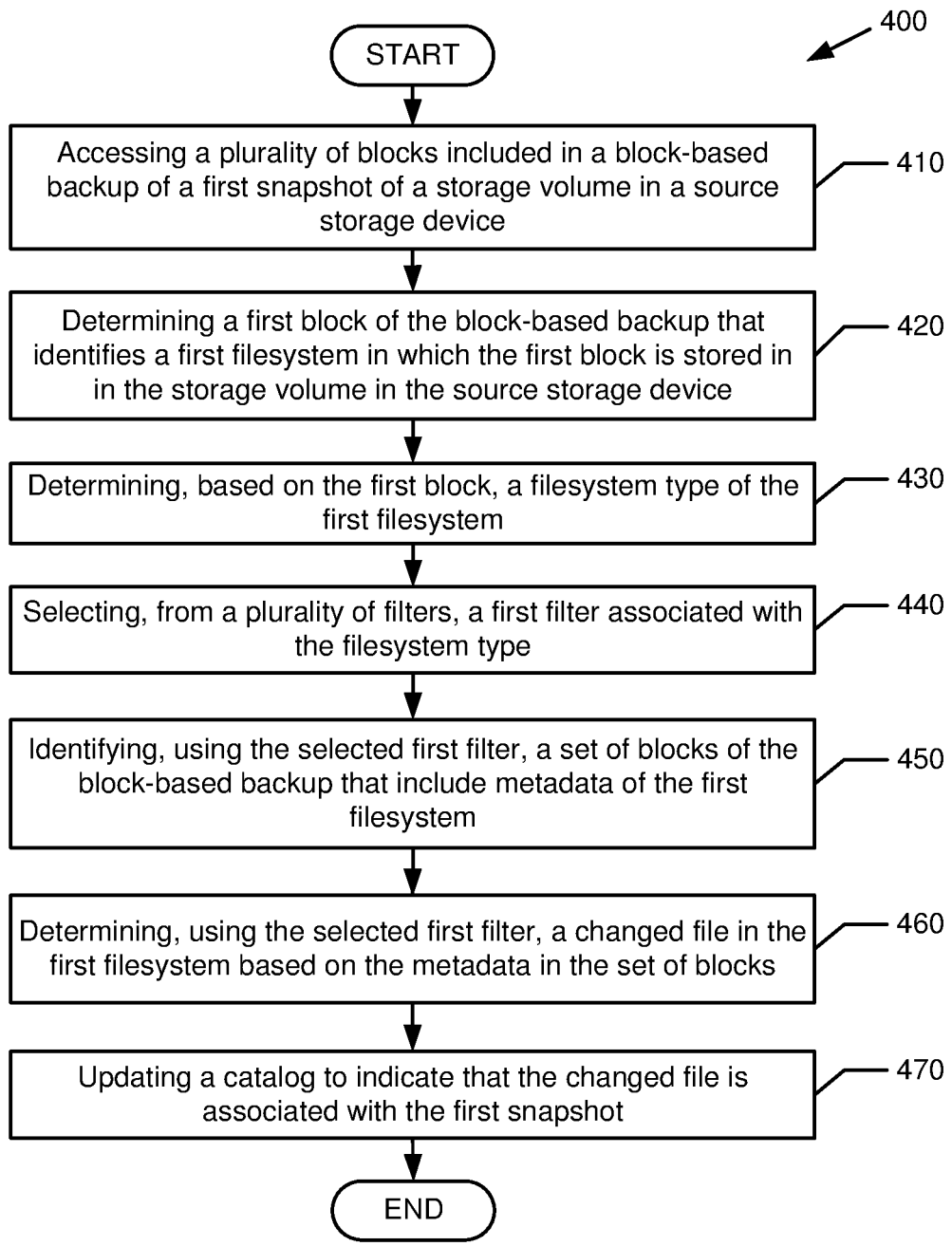
FIG. 4 is an illustration of an example process, in accordance with some implementations.

Referring now to FIG. 4, shown is an example process 400, in accordance with some implementations. In some examples, the process 400 may be performed using some or all of the catalog module 117 (shown in FIGS. 1 and 3). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 may be described below with reference to FIGS. 1-3, which show examples in accordance with some implementations. However, other implementations are also possible.

Block 410 may include accessing a plurality of blocks included in a block-based backup of a first snapshot of a storage volume. For example, referring to FIGS. 1-3, the catalog logic 310 may read or otherwise access blocks included in the snapshot backup 350A (or in data stream 160A). The snapshot backup 350A may be a block-based backup of the snapshot 150A of volume 125. In some implementations, the snapshot backup 350A may be a block-based backup that stores blocks in deduplicated form.

Block 420 may include determining a first block of the block-based backup that identifies a first filesystem in which the block is stored in the storage volume in a source storage device. Block 430 may include determining, based on the first block, a filesystem type of the first filesystem. For example, referring to FIGS. 1-3, the catalog logic 310 may identify a block in snapshot backup 350A (or in data stream 160A) that includes a particular identifier (e.g., a predefined hex value) in a specific location of the block, and may thereby determine that data included in the associated snapshot 150A is stored in a specific type of filesystem (e.g. an XFS filesystem) in the storage volume of the source storage device.

Block 440 may include selecting, from a plurality of filters, a first filter associated with the filesystem type. Block 450 may include identifying, using the selected first filter, a set of blocks of the block-based backup that include metadata of the first filesystem. For example, referring to FIGS. 1-3, the catalog logic 310 may select a filter 320 that corresponds to the determined filesystem type. In some implementations, the catalog logic 310 may use the filter 320 to locate and interpret metadata in blocks of snapshot backup 350A (or data stream 160A) associated with the determined filesystem type. In some examples, the catalog logic 310 may use the filter 320 to identify metadata in blocks of the block-based backup, where the blocks of the block-based backup represent changed blocks between respective snapshots (represented by respective block-based backups). In some examples, the catalog logic 310 may use the filter 320 to identify metadata in all blocks of a block-based backup.

Block 460 may include determining, using the selected first filter, a changed file in the first filesystem based on the metadata in the set of blocks. For example, referring to FIGS. 1-3, the catalog logic 310 may analyze metadata in blocks of a snapshot backup 350A (or data stream 160A), that represents changed blocks in a collection of data between different points of time, to determine a list of files and/or directories that may have been changed between those different points of time (e.g., between respective snapshots or backups). Further, the catalog logic 310 may compare the determined list to a previous list of objects, and may determine a changed file based on the differences between the two lists.

Block 470 may include updating a catalog to indicate that the changed file is associated with the first snapshot. The catalog may include information regarding filesystem objects associated with one or more snapshots. For example, referring to FIGS. 1-3, the catalog logic 310 may update a catalog 330 to include information regarding the files and directories associated with the snapshot 150A. For example, a catalog 330 may list the files and directories that were changed in each snapshot 150A-150C (relative to another snapshot, respectively). After block 470, the process 400 may be completed. Note that process 400 may be repeated for each snapshot 150.

Figure 5:
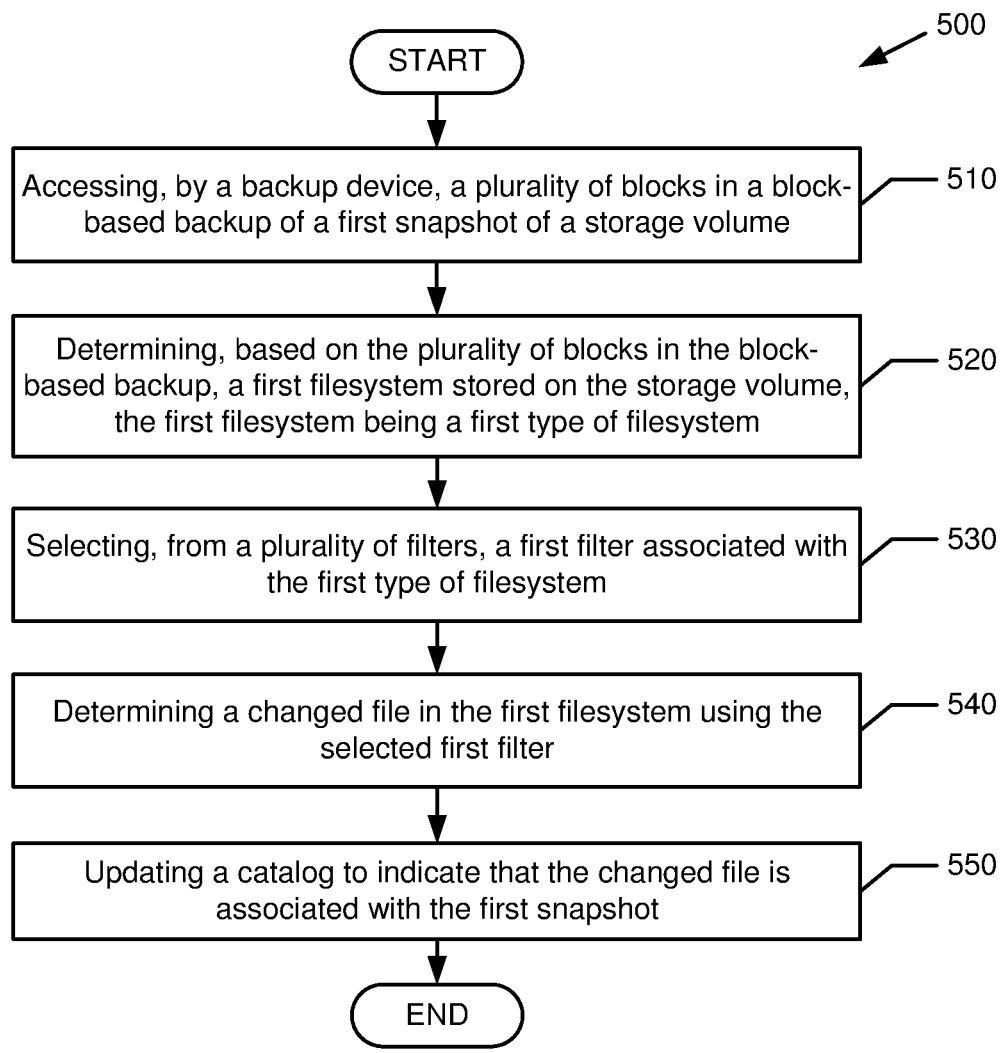
FIG. 5 is an illustration of an example process, in accordance with some implementations.

Referring now to FIG. 5, shown is an example process 500, in accordance with some implementations. In some examples, the process 500 may be performed using some or all of the catalog module 117 (shown in FIGS. 1 and 3). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1-3, which show examples in accordance with some implementations. However, other implementations are also possible.

Block 510 may include accessing a plurality of blocks in a block-based backup of a first snapshot of a storage volume. For example, referring to FIGS. 1-3, the catalog logic 310 may read or otherwise access blocks included in the snapshot backup 350A (or in data stream 160A). The snapshot backup 350A may be a block-based backup of the snapshot 150A of volume 125. In some implementations, the snapshot backup 350A may store blocks in deduplicated form.

Block 520 may include determining, based on the plurality of blocks of the block-based backup, a first filesystem stored (at least in part) on the storage volume, the first filesystem being a first type of filesystem. For example, referring to FIGS. 1-3, the catalog logic 310 may identify a block in snapshot backup 350A (or in data stream 160A) that includes a particular identifier in a specific location of the block, and may thereby determine that data of a specific type of filesystem (e.g. an XFS filesystem) is included in the associated snapshot 150A.

Block 530 may include selecting, from a plurality of filters, a first filter associated with the first type of filesystem. For example, referring to FIGS. 1-3, the catalog logic 310 may select a filter 320 that corresponds to the determined filesystem type. In some implementations, the catalog logic 310 may use the filter 320 to locate and interpret metadata in blocks of snapshot backup 350A (or data stream 160A) associated with the determined filesystem type. In some examples, the catalog logic 310 may use the filter 320 to identify metadata exclusively in changed blocks of the block-based backup. In other examples, the catalog logic 310 may use the filter 320 to identify metadata in all blocks of the block-based backup.

Block 540 may include determining a changed file in the first filesystem based on the selected first filter. For example, referring to FIGS. 1-3, the catalog logic 310 may analyze metadata in the changed blocks of snapshot backup 350A (or data stream 160A) to determine a list of files and/or directories that may have been changed between different points in time (e.g., between snapshots or backups), may compare the determined list to a previous list of objects, and may identify a changed file based on the differences between the two lists.

Block 550 may include updating a catalog to indicate that the changed file is associated with the first snapshot. For example, referring to FIGS. 1-3, the catalog logic 310 may update a catalog 330 to include information regarding the files and directories associated with the snapshot 150A. For example, a catalog 330 may list, for each of snapshots 150A-150C, the files and directories that have changes represented in those snapshots, respectively. After block 550, the process 500 may be completed. Note that the process 500 may be repeated for each snapshot 150.

Figure 6:
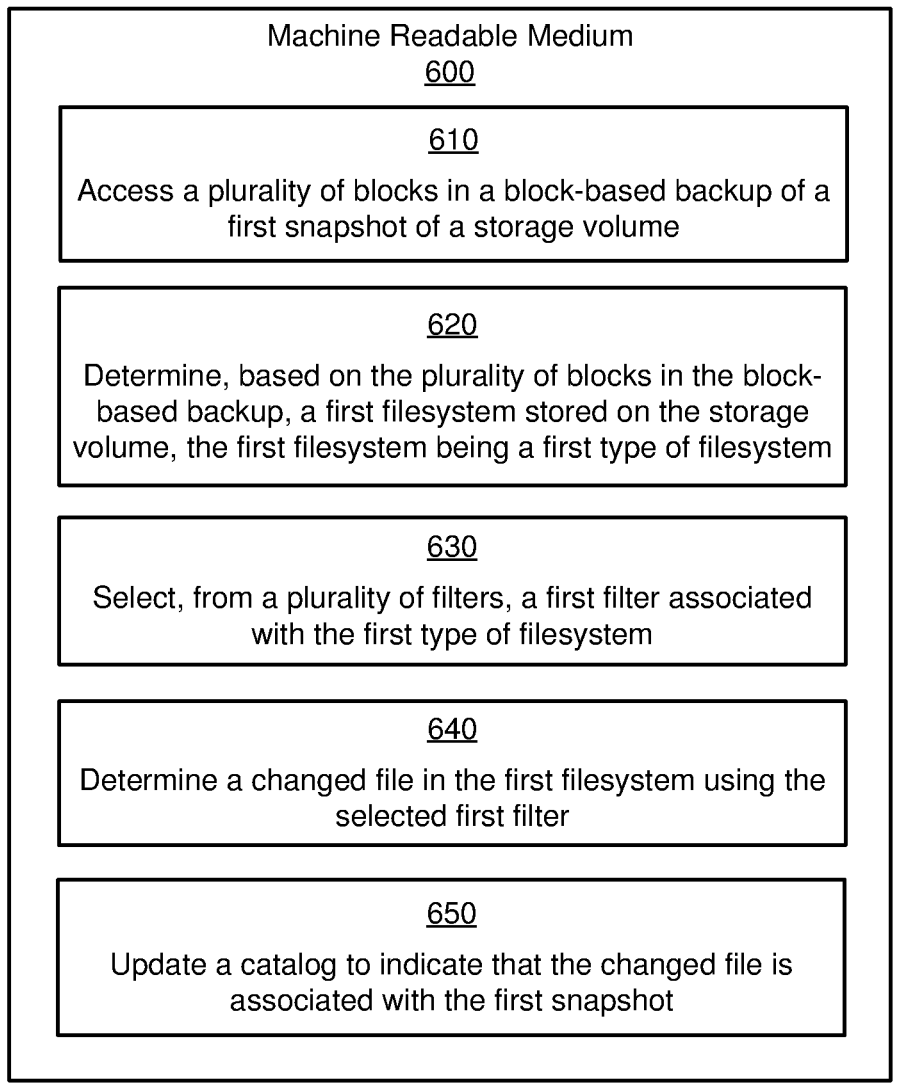
FIG. 6 is a diagram of an example machine-readable medium storing instructions in accordance with some implementations.

Referring now to FIG. 6, shown is machine-readable medium 600 storing instructions 610-650, in accordance with some implementations. The instructions 610-650 can be executed by a single processor (e.g., the processing resource 112 shown in FIG. 1), multiple processors, a single processing engine, multiple processing engines, and so forth. The machine-readable medium 600 may be a non-transitory storage medium, such as an optical, semiconductor, or magnetic storage medium.

Instructions 610 may be executed to access a plurality of blocks in a block-based backup of a first snapshot of a storage volume. For example, instructions 610 may read or otherwise access blocks included in the snapshot backup 350A (or in data stream 160A). The snapshot backup 350A may be a block-based backup of the snapshot 150A of volume 125. In some implementations, the snapshot backup 350A may store blocks in deduplicated form.

Instructions 620 may be executed to determine, based on the plurality of blocks of the block-based backup, a first filesystem in which data is stored on the storage volume, the first filesystem being a first type of filesystem. For example, referring to FIGS. 1-3 and 6, instructions 620 may identify a block in snapshot backup 350A (or in data stream 160A) that includes a particular identifier in a specific location of the block, and may thereby determine that data of a specific type of filesystem (e.g. an XFS filesystem) is included in the associated snapshot 150A.

Instructions 630 may be executed to select, from a plurality of filters, a first filter associated with the first type of filesystem. For example, referring to FIGS. 1-3 and 6, instructions 630 may select a filter 320 that corresponds to the determined filesystem type. In some implementations, instructions 630 may use the filter 320 to locate and interpret metadata in blocks of snapshot backup 350A (or data stream 160A) associated with the determined filesystem type. In some examples, instructions 630 may use the filter 320 to identify metadata exclusively in changed blocks of the block-based backup. In other examples, instructions 630 may use the filter 320 to identify metadata in all blocks of the block-based backup.

Instruction 640 may be executed to determine a changed file in the first filesystem based on the selected first filter. For example, referring to FIGS. 1-3 and 6, instructions 640 may analyze metadata in the changed blocks of snapshot backup 350A (or data stream 160A) to determine a list of files and/or directories that may have been changed between different points in time (e.g., between snapshots or backups), may compare the determined list to a previous list of objects, and may identify a changed file based on the differences between the two lists.

Instruction 650 may be executed to update a catalog to indicate that the changed file is associated with the first snapshot. For example, referring to FIGS. 1-3 and 6, instructions 650 may update a catalog 330 to include information regarding the files and directories associated with the snapshot 150A. For example, a catalog 330 may list the files and directories having changes represented in each snapshot 150A-150C.

Figure 7:
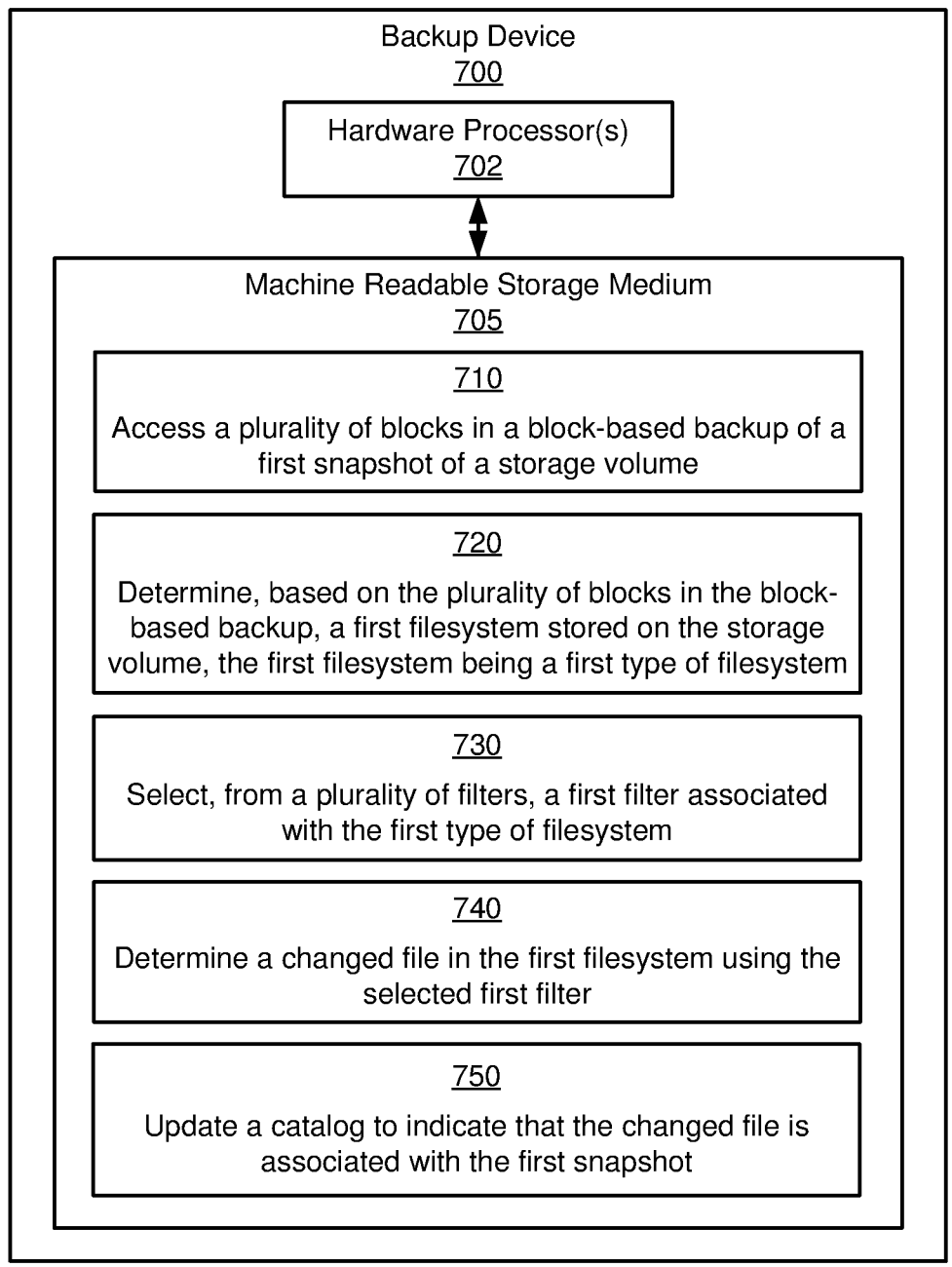
FIG. 7 is a schematic diagram of an example computing device, in accordance with some implementations.

Referring now to FIG. 7, shown is a schematic diagram of an example computing device 700. In some examples, the computing device 700 may correspond generally to the computing device 110 (shown in FIG. 1). As shown, the computing device 700 may include hardware processor 702 and machine-readable storage 705 including instruction 710-750. The machine-readable storage 705 may be a non-transitory medium. The instructions 710-750 may be executed by the hardware processor 702, or by a processing engine included in hardware processor 702.

Instructions 710 may be executed to access a plurality of blocks in a block-based backup of a first snapshot of a storage volume. For example, referring to FIGS. 1-3 and 7, instructions 710 may read or otherwise access blocks included in the snapshot backup 350A (or in data stream 160A). The snapshot backup 350A may be a block-based backup of the snapshot 150A of volume 125. In some implementations, the snapshot backup 350A may store blocks in deduplicated form.

Instructions 720 may be executed to determine, based on the plurality of blocks of the block-based backup, a first filesystem stored (at least in part) on the storage volume, the first filesystem being a first type of filesystem. For example, referring to FIGS. 1-3 and 7, instructions 720 may identify a block in snapshot backup 350A (or in data stream 160A) that includes a particular identifier in a specific location of the block, and may thereby determine that data of a specific type of filesystem (e.g. an XFS filesystem) is included in the associated snapshot 150A.

Instructions 730 may be executed to select, from a plurality of filters, a first filter associated with the first type of filesystem. For example, referring to FIGS. 1-3 and 7, instructions 730 may select a filter 320 that corresponds to the determined filesystem type. In some implementations, instructions 730 may use the filter 320 to locate and interpret metadata in blocks of snapshot backup 350A (or data stream 160A) associated with the determined filesystem type. In some examples, instructions 730 may use the filter 320 to identify metadata exclusively in changed blocks, which are represented by the block-based backup. In other examples, instructions 730 may use the filter 320 to identify metadata in all blocks of the block-based backup.

Instructions 740 may be executed to determine a changed file in the first filesystem based on the selected first filter. For example, referring to FIGS. 1-3 and 7, instructions 740 may analyze metadata in the changed blocks represented in snapshot backup 350A (or data stream 160A) to determine a list of files and/or directories that may have been changed between different points in time (e.g., between different snapshots or backups), may compare the determined list to a previous list of objects, and may identify a changed file based on the differences between the two lists.

Instructions 750 may be executed to update a catalog to indicate that the changed file is associated with the first snapshot. For example, referring to FIGS. 1-3 and 7, instructions 750 may update a catalog 330 to include information regarding the files and directories associated with the snapshot 150A. For example, a catalog 330 may list the files and directories that were changed in each snapshot 150A-150C.

Note that, while FIGS. 1-7 show various examples, implementations are not limited in this regard. For example, referring to FIG. 1, it is contemplated that the system 100 may include additional devices and/or components, fewer components, different components, different arrangements, and so forth. In another example, it is contemplated that backup module 115 and catalog module 117 may be combined into a single module, or may be included in any another module or software of backup device 110. In yet another example, it is contemplated that the files systems 140 and/or snapshots 150 may be included in any number of storage devices 120, and/or the snapshot backups 350 may be stored in any number of backup devices (not shown). Other combinations and/or variations are also possible.

In accordance with some implementations, examples are provided for catalogs of files associated with snapshots. Some implementations may include analyzing blocks of a block-based backup of a snapshot, identifying a filesystem included in the blocks, and selecting a particular filter that corresponds to a type of the filesystem. The selected filter may be used to identify blocks that include metadata of the filesystem. The metadata may be analyzed to determine any changes in the objects in the filesystem. The determined changes are then used to generate and/or update a catalog of objects associated with various snapshots. Accordingly, some implementations may reduce the amount of time and processing bandwidth required to identify filesystem objects associated with snapshots.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A backup system comprising:
   a processor comprising a plurality of processing engines; and
   a machine-readable storage storing instructions, the instructions executable by the processor to:
   access a plurality of blocks in a block-based backup of a first snapshot of a storage volume;
   determine, based on the plurality of blocks in the block-based backup, a first filesystem stored on the storage volume, the first filesystem being a first type of filesystem;
   select, from a plurality of filters, a first filter associated with the first type of filesystem;
   execute the selected first filter to identify a set of blocks comprising each block in the first snapshot that includes metadata about files and directories of the first filesystem, wherein the selected first filter is executed to determine that each block in the identified set of blocks matches criteria associated with metadata about files and directories of the first filesystem;
   identify a changed file in the first filesystem based on the identified set of blocks that include the metadata about files and directories of the first filesystem, wherein the changed file is changed between the first snapshot and a previous snapshot; and
   in response to an identification of the changed file in the first filesystem, update a catalog to indicate that the changed file is associated with the first snapshot.

2. The computing device of claim 1, the instructions executable by the processor to:
   determine a first block that identifies the first filesystem in the storage volume; and
   determine, based on the first block, the first type of filesystem.

3. The computing device of claim 1, the instructions executable by the processor to:
   access the plurality of blocks of the block-based backup from a first data stream as received by the backup device from a storage system including the storage volume.

4. The computing device of claim 1, the instructions executable by the processor to:
   access the plurality of blocks of the block-based backup after the block-based backup is stored in a backup store of the backup device.

5. The computing device of claim 1, wherein the catalog only includes information regarding a plurality of files that are changed between the first snapshot and the previous snapshot, and wherein the catalog is persistently stored on the machine-readable storage.

6. The computing device of claim 1, the instructions executable by the processor to:
   analyze the metadata in the set of blocks to determine names and locations of a set of objects of the first filesystem;
   track the set of objects in a data structure during analysis of the metadata;
   determine a tree structure based on the tracked set of objects;
   identify differences between the tree structure and a previous tree structure; and determine the changed file in the first filesystem based on the identified differences.

7. The computing device of claim 1, the instructions executable by the processor to:
determine, based on the plurality of blocks, a second filesystem stored on the storage volume, the second filesystem being a second type of filesystem;
select, from a plurality of filters, a second filter associated with the second type of filesystem; and
determine a changed object in the second filesystem based on the selected second filter.

8. A non-transitory machine-readable medium storing instructions that upon execution cause a processor to:
access, by a backup system, a plurality of blocks included in a block-based backup of a first snapshot of a storage volume;
determine, based on the plurality of blocks of the block-based backup, a first filesystem stored on the storage volume, the first filesystem being a first type of filesystem;
select, from a plurality of filters, a first filter associated with the first type of filesystem;
execute the selected first filter to identify a set of blocks comprising each block in the first snapshot that includes metadata about files and directories of the first filesystem, wherein the selected first filter is executed to determine that each block in the identified set of blocks matches criteria associated with metadata about files and directories of the first filesystem;
identify a changed file in the first filesystem based on the identified set of blocks that include the metadata about files and directories of the first filesystem, wherein the changed file is changed between the first snapshot and a previous snapshot; and
in response to an identification of the changed file in the first filesystem, update a catalog to indicate that the changed file is associated with the first snapshot.

9. The non-transitory machine-readable storage medium of claim 8, including instructions to cause the processor to:
determine a first block that identifies the first filesystem in the storage volume; and
determine, based on the first block, the first type of filesystem.

10. The non-transitory machine-readable storage medium of claim 8, including instructions to cause the processor to:
access the plurality of blocks of the block-based backup from a first data stream as received by the backup device from a storage system including the storage volume.

11. The non-transitory machine-readable storage medium of claim 8, including instructions to cause the processor to:
access the plurality of blocks of the block-based backup after the block-based backup is stored in a backup store of the backup device.

12. The non-transitory machine-readable storage medium of claim 8, wherein the catalog only includes information regarding a plurality of files that are changed between the first snapshot and the previous snapshot, and wherein the catalog is persistently stored on the machine-readable storage.

13. The non-transitory machine-readable storage medium of claim 8, including instructions to cause the processor to:
analyze the metadata in the set of blocks to determine names and locations of a set of objects of the first filesystem;
track the set of objects in a data structure during analysis of the metadata;
determine a tree structure based on the tracked set of objects;
identify differences between the tree structure and a previous tree structure; and
determine the changed file in the first filesystem based on the identified differences.

14. The non-transitory machine-readable storage medium of claim 8, including instructions to cause the processor to:
determine, based on the plurality of blocks, a second filesystem stored on the storage volume, the second filesystem being a second type of filesystem;
select, from a plurality of filters, a second filter associated with the second type of filesystem; and
determine a changed object in the second filesystem based on the selected second filter.

15. A computer implemented method, comprising:
accessing, by a backup system, a plurality of blocks included in a block-based backup of a first snapshot of a storage volume;
determining, based on the plurality of blocks of the block-based backup, a first filesystem stored on the storage volume, the first filesystem being a first type of filesystem;
selecting, from a plurality of filters, a first filter associated with the first type of filesystem;
executing the selected first filter to identify a set of blocks comprising each block in the first snapshot that includes metadata about files and directories of the first filesystem, wherein the selected first filter is executed to determine that each block in the identified set of blocks matches criteria associated with metadata about files and directories of the first filesystem;
identifying a changed file in the first filesystem based on the identified set of blocks that include the metadata about files and directories of the first filesystem, wherein the changed file is changed between the first snapshot and a previous snapshot; and
in response to an identification of the changed file in the first filesystem, updating a catalog to indicate that the changed file is associated with the first snapshot.

16. The computer implemented method of claim 15, comprising:
determining a first block that identifies the first filesystem in the storage volume, wherein determining the first block comprises determining that a predefined value is stored in a specific location of the first block; and
determining, based on the first block, the first type of filesystem.

17. The computer implemented method of claim 15, comprising:
accessing the plurality of blocks of the block-based backup from a first data stream as received by the backup device from a storage system including the storage volume.

18. The computer implemented method of claim 15, comprising:
accessing the plurality of blocks of the block-based backup after the block-based backup is stored in a backup store of the backup device.

19. The computer implemented method of claim 15, wherein the catalog only includes information regarding a plurality of files that are changed between the first snapshot and the previous snapshot, and wherein the catalog is persistently stored on the machine-readable storage.

20. The computer implemented method of claim 15, comprising:

determine, based on the plurality of blocks, a second filesystem stored on the storage volume, the second filesystem being a second type of filesystem;
select, from a plurality of filters, a second filter associated with the second type of filesystem; and
determine a changed object in the second filesystem based on the selected second filter.

\* \* \* \* \*